United States Patent [19]
Richardson

[11] 3,718,284
[45] Feb. 27, 1973

[54] METHOD OF AND APPARATUS FOR COMMUNITING RUBBER TIRES

[76] Inventor: Vernon C. H. Richardson, 5312 Brae Burn, Bellaire, Tex.

[22] Filed: April 26, 1971

[21] Appl. No.: 137,167

[52] U.S. Cl. ................................. 241/23, 241/65
[51] Int. Cl. ........................................ B02c 11/08
[58] Field of Search ............................. 241/23, 65

[56] References Cited

UNITED STATES PATENTS

| | | | |
|---|---|---|---|
| 1,978,204 | 10/1934 | Hurt | 241/23 X |
| 3,527,414 | 9/1970 | Schorsch | 241/23 |
| 2,609,150 | 9/1952 | Bludeau | 241/65 X |
| 2,827,505 | 3/1958 | Farrell et al. | 241/23 X |
| 3,614,001 | 10/1971 | Beike | 241/23 |

Primary Examiner—Granville Y. Custer, Jr.
Attorney—Charles E. Lightfoot

[57] ABSTRACT

A method of and apparatus for reducing discarded automobile tires to a comminuted condition.

The apparatus comprises means for subjecting the tires in a whole condition to refrigeration to cause embrittlement of the material of the tires and including mechanism for crushing the embrittled tires to release reinforcing wires from the beads thereof and means for grinding the crushed material to a desired fineness.

The method of the invention includes subjecting the tires in a whole condition to refrigeration to cause embrittlement of the material, crushing the embrittled material to release the reinforcing wires of the beads and grinding the crushed material while in an embrittled state to a desired degree of fineness.

7 Claims, 1 Drawing Figure

PATENTED FEB 27 1973
3,718,284
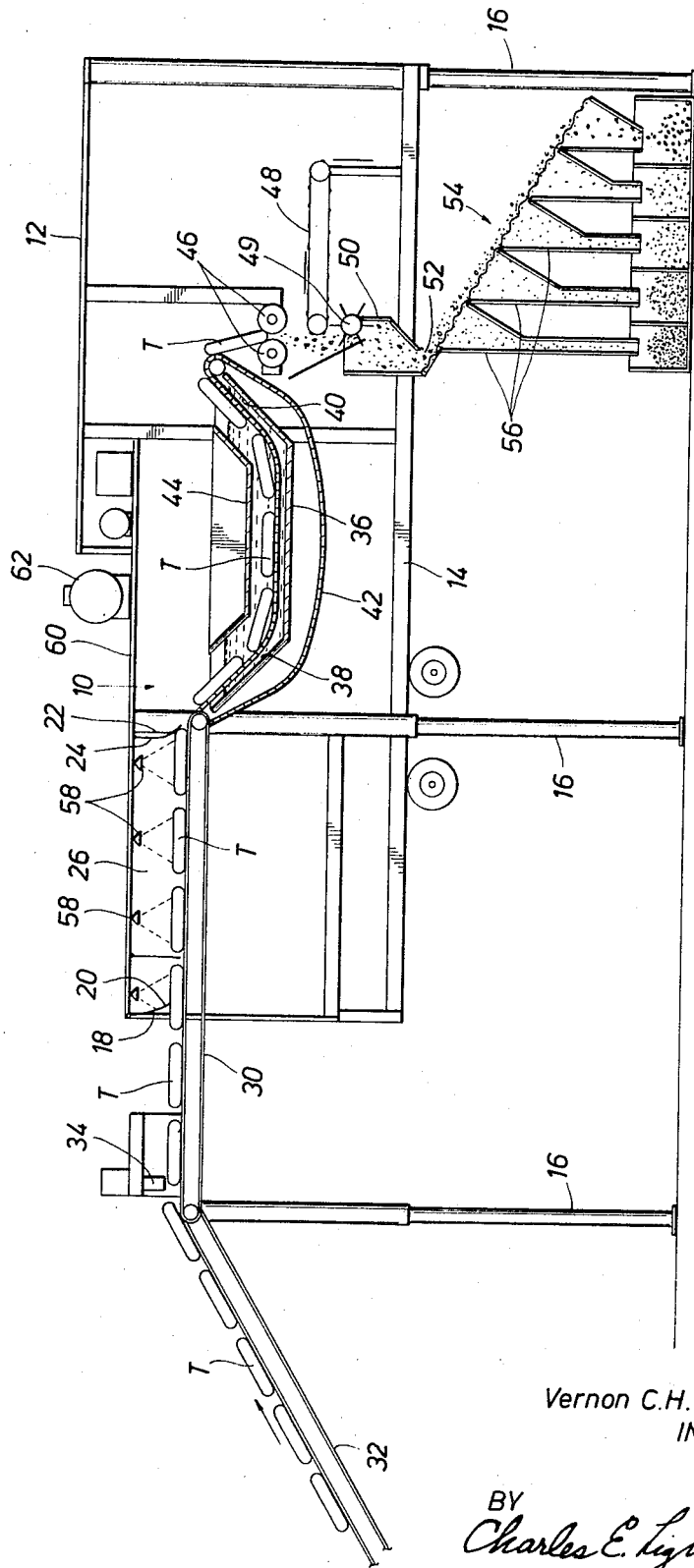
Vernon C.H. Richardson
INVENTOR
BY
Charles E. Lightfoot
ATTORNEY

METHOD OF AND APPARATUS FOR COMMUNITING RUBBER TIRES

BACKGROUND OF THE INVENTION

Large numbers of automobile tires are being constantly worn out and discarded, and the rapid accumulation of such tires presents a difficult problem in solid waster disposal.

Various proposals have been made heretofore for the disposal of such waste, such as by burning the same, using the tires for land fill or filling the same with concrete and using them to form underwater barriers or reefs.

The burning of large quantities of old tires has been found to be unsatisfactory and undesirable because of the resulting air pollution. The use of tires for land fill purposes has also been found unsatisfactory because of the resistance to decomposition of the materials of which they are made and the resiliency and buoyancy of the tires which gives them a tendency to rise to the surface when the land fill is disturbed as by grading operations intended to render the same suitable for building sites. The labor and expense involved in filling tires with concrete and transporting and placing them for use as barriers or reefs has made such a procedure too costly for practical application.

It has also been proposed to utilize old tires by reducing them to a comminuted form, as by grinding, the comminuted material being graded as to particle size, some of which is mixed with oil and subjected to combustion to make carbon black. The comminuted material is also utilized with other material for the molding of articles of rubber, such as new tires.

Automobile tires, as oridinarily manufactured have an outer layer or tread portion which is formed of relatively hard, durable rubber composition and an inner layer of softer, more resilient rubber composition in which layers of fabric are embedded and which is adhered to the interior of the tread. As commonly constructed automobile tires are of hollow, generally doughnut shape having an inner annular opening formed with annular, marginal, bead portions on each side of the opening within which bead portions reinforcing metal wire or cables are embedded.

In the comminuting of tires of this kind as heretofore carried out, the marginal bead portions containing the reinforcing wires or cables are first removed by cutting off such portions. The remaining portion of the tire is then cut up by subjecting the same to chopping mechanism to reduce the tires to coarse pieces which are then ground into fine particles. The resulting finely ground material is finally subjected to a classifying process during which the fluff or lint in the same from the fabric of the tires is sometimes removed by subjecting the ground material to air currents.

The carrying out of this method of reducing tires to a pulverulent state is very expensive due to the preliminary bead removing operation and the chopping of the material into coarse pieces, as well as the extreme wear on the grinding apparatus, resulting in high cost of maintenance and repair.

SUMMARY OF THE INVENTION

The present invention, briefly described, comprises apparatus for comminuting automobile tires formed of rubber or the like, by which tires in a whole condition are subjected to refrigeration at a very low temperature to cause embrittlement of the rubber, the embrittled tires being then subjected to crushing to release the reinforcing material from the beads and the debeaded crushed material then being ground to the desired particle size. The apparatus includes conveyor mechanism for handling the tires in a whole condition to convey the tires to a location for refrigeration and, when refrigerated, to the crushing mechanism. Means is provided for removing the bead reinforcing material from the crushed tire and for subsequently grinding the crushed material to the desired particle size.

The method of the invention comprises the refrigeration of automobile tires in a whole condition to cause embrittlement of the material of the tires, the crushing of the embrittled tires to release the reinforcing wires or cables from the beads of the tires and the grinding of the crushed material to reduce the same to a comminuted state. The refrigeration of the tires may be conveniently accomplished by introducing the same into a bath of a liquid refrigerant, such as liquid nitrogen, or by spraying the tires with such a refrigerant, or subjecting the same to a suitable refrigerant, such as liquid or solid carbon dioxide or other refrigerant capable of reducing the material of the tire to a temperature sufficiently low to cause embrittlement of the material.

The invention has for an important object the provision of a method and apparatus for comminuting tires in which a large part of the labor and expense of handling and grinding the article is eliminated by refrigerating the tires in a whole condition to cause embrittlement of the material whereby the tires may be readily crushed in their embrittled conditions to release the bead reinforcing material therefrom and subsequently ground to a desired condition of comminution.

BRIEF DESCRIPTION OF THE DRAWINGS

In the drawings, the single FIGURE is a fragmentory, side elevational view, partly in cross-section illustrating the apparatus of the invention by which automobile tires are handled in a whole condition for subjection to refrigeration and are subsequently crushed and ground.

DETAILED DESCRIPTION OF A PARTICULAR EMBODIMENT OF THE APPARATUS AND OF A PREFERRED MANNER OF CARRYING OUT THE METHOD OF THE INVENTION

Referring now to the drawings, the apparatus of the invention comprises a building structure forming an enclosed chamber, generally designated 10, which structure may of any convenient design having top and bottom walls, such as those shown at 12 and 14, respectively, and suitable side and end walls forming a generally cubical enclosure.

The enclosure may, for purposes of convenience, be supported in a somewhat elevated position, as by means of stanchions or posts 16, which may be extensible if desired, to permit adjustment of the elevation of the enclosure. The entire structure may thus be adapted for use as a trailer vehicle to be towed about from place to place wherever it may be desired to treat discarded tires, or as a portable building which may be readily dismantled for purposes of transportation.

The walls of the enclosure may be suitably insulated to prevent the rapid transfer of heat from the exterior.

At its front end the enclosure has an opening 18, covered by a suitable closure, such as a curtain or flexible door 20, through which tires may be moved into the treating chamber, and within the enclosure a similar opening 22 is closed by a similar flexible door 24, to define a preliminary treating zone, indicated at 26.

A horizontal endless conveyor 30 extends through the treating zone 26 and forwardly from the front opening 18 and upwardly inclined endless conveyor 32 is positioned to discharge tires onto the conveyor 30 from a location on the ground.

The conveyor 30 also extends at its forward end beneath a perforating or punching device 34, located to punch one or more holes in the casing of each tire as the same passes beneath the device.

Within the enclosure, inwardly beyond the inner end of the conveyor 30, a receptacle 36 is supported in position to receive tires as they are discharged from the conveyor. The receptacle may be of tub or tank-like construction, having downwardly sloping front and rear end wall portions 38 and 40, respectively over which the tires pass as they enter and leave the receptacle. The receptacle is adapted to hold a suitable refrigerant, such as liquid nitrogen to form a bath through which the tires may be moved to refrigerate the same.

An endless conveyor 42 is suitably supported at its ends and extends through the receptacle from end to end thereof over the bottom of the receptacle and over its opposite ends and beneath the bottom of the receptacle to convey tires through the receptacle.

Suitable means, such as the cover 44 is positioned in the receptacle, in upwardly spaced relation to the bottom of the receptacle and above the conveyor 42, which cover is shaped to form a passageway through the receptacle through which the tires pass through the bath of liquid refrigerant, whereby the tires will be submerged in the bath.

Crushing mechanism, such as a pair of spaced rollers 46, is located beyond the discharge end of the receptacle 36 in position to receive and crush the embrittled tires as they are discharged from the receptacle, and beneath the outlet of the crushing mechanism an endless conveyor 48 is located, which may be provided with magnets or other means adapted to remove the annular reinforcing wires of the beads of the tires from the crushed material thereof and to convey these to any convenient location for disposal.

Suitable comminuting means, such as a hammer mill 49 is located beneath the crushing mechanism in position to receive the crushed material and grind the same to any desired degree of fineness.

Beneath the grinding mechanism 49 a hopper 50 is positioned to catch the ground material, which hopper has a discharge outlet 52 leading to suitable classifier mechanism, such as an inclined screen means 54 having portions of different mesh sizes positioned to allow the passage therethrough of different sizes of particles into hoppers 56, from which the graded comminuted material may be loaded into bags or other containers for disposal.

The tires may be treated in a whole condition in the refrigeration zone 26 by spraying the tires with a suitable refrigerant, such as liquid nitrogen dispensed through nozzles 58 from a supply pipe 60 leading to a tank or other suitable supply receptacle 62. By precooling the tires the length of time which the tires remain in the liquid bath in the receptacle 36 may be substantially reduced, or, if desired, the liquid bath may be omitted and the tires reduced to the desired state of embrittlement in the zone 26 alone.

In making use of the invention, constructed as described above, discarded tires T are placed on the conveyor 32 at the ground level, whereupon the tires are deposited on conveyor 30.

The tires may be suitably perforated as they pass beneath the punch 34 to provide holes suitably located to permit the quick drainage of liquid refrigerant therefrom when the tires pass out of the liquid refrigerant bath.

The tires are passed into and out of the zone 26 on the conveyor 30, with or without the spraying of the refrigerant thereon, the flexible doors 18 and 24 with the chamber 26 forming a trap to prevent loss of refrigerant from the apparatus.

The perforated and precooled tires are deposited on the conveyor 36 from the conveyor 30 and then pass through the receptacle 36, being held beneath the level of the liquid refrigerant L therein by the cover 44.

As the tires move upwardly along the sloping rear end wall 40 of the receptacle any liquid in the tires may quickly drain out through the perforations thereof, so that depletion of the refrigerant bath, due to entrapment of the liquid in the tires, is avoided.

The refrigerated, embrittled tires are then passed between the crushing rollers 46 to crush the embrittled material and release the bead wires of the tires, whereupon the bead wires are removed by the conveyor 48, or some other suitable means, while the crushed material falls into the hopper 50.

Because of the low temperature to which the tires are exposed (−320° F. in the case of liquid nitrogen) the tires are rendered brittle and readily crushable and remain so during passage of the tires through the crushing and grinding mechanism so that the material is easily reduced to a comminuted or relatively pulverized condition.

The method of the invention comprises the treatment of the tires in a whole condition, which may include perforating the tires at suitable locations to allow drainage from the interior, refrigeration of the tires to cause embrittlement of the material thereof, crushing the embrittled article to release the bead reinforcing means and grinding the crushed material to the desired degree of fineness.

It will be apparent that by subjecting the tires in a whole condition to refrigeration to cause embrittlement of the material, any preliminary removal of the beads or chopping of the tires is eliminated, whereby the labor and expense of the comminuting operation is greatly reduced, while at the same time the time required for the reduction of the tires to a pulverulent condition is substantially lessened.

Having thus clearly shown and described the invention, what is claimed as new and desired to secure by Letters Patent is:

1. Apparatus for comminuting automobile tires of the type having annular bead portions provided with embedded annular reinforcing members, comprising
    means for forming perforations in the tires;

means for contacting the perforated tires in a whole condition with liquid nitrogen to cause embrittlement of the material thereof;

means for crushing the embrittled tires to release said reinforcing members; and, means for grinding the crushed embrittled material to a pulverulent condition.

2. The apparatus as claimed in claim 1 including means for separating said reinforcing members from the crushed material of the tires.

3. The apparatus as claimed in claim 1 including means for submerging the perforated tires in a bath of liquid nitrogen.

4. The method of comminuting automobile tires of the type having annular bead portions provided with annular reinforcing members embedded therein, comprising perforating the tires;

subjecting the tires interiorly and exteriorly simultaneously in a whole condition to contact with a liquid refrigerant to cause embrittlement of the material thereof, and thereafter crushing the embrittled tires to release said reinforcing members.

5. The method as claimed in claim 4 including separating the reinforcing members from the crushed material of the tires and grinding the crushed material while in an embrittled condition.

6. The method as claimed in claim 4, including submerging the tires in a whole condition in a bath of liquid nitrogen, and removing the tires from said bath and allowing said liquid nitrogen to drain from the tires through said perforations before crushing the embrittled tires.

7. The method as claimed in claim 4 including subjecting the tires in a whole condition to a preliminary cooling, and introducing the cooled tires in a whole condition into a bath of liquid nitrogen to further cool the tires to a temperature at which the material of the tires become brittle.

* * * * *